Oct. 31, 1950          A. JESONIS         2,528,147
PIPE CUTTING MACHINE TO PRODUCE PREDETERMINED
CONTOURS OF CUTS

Filed Jan. 28, 1948                                    2 Sheets-Sheet 1

INVENTOR.
Alexander Jesonis
BY
Johnson and Kline
ATTORNEYS

Oct. 31, 1950  A. JESONIS  2,528,147
PIPE CUTTING MACHINE TO PRODUCE PREDETERMINED
CONTOURS OF CUTS
Filed Jan. 28, 1948  2 Sheets-Sheet 2
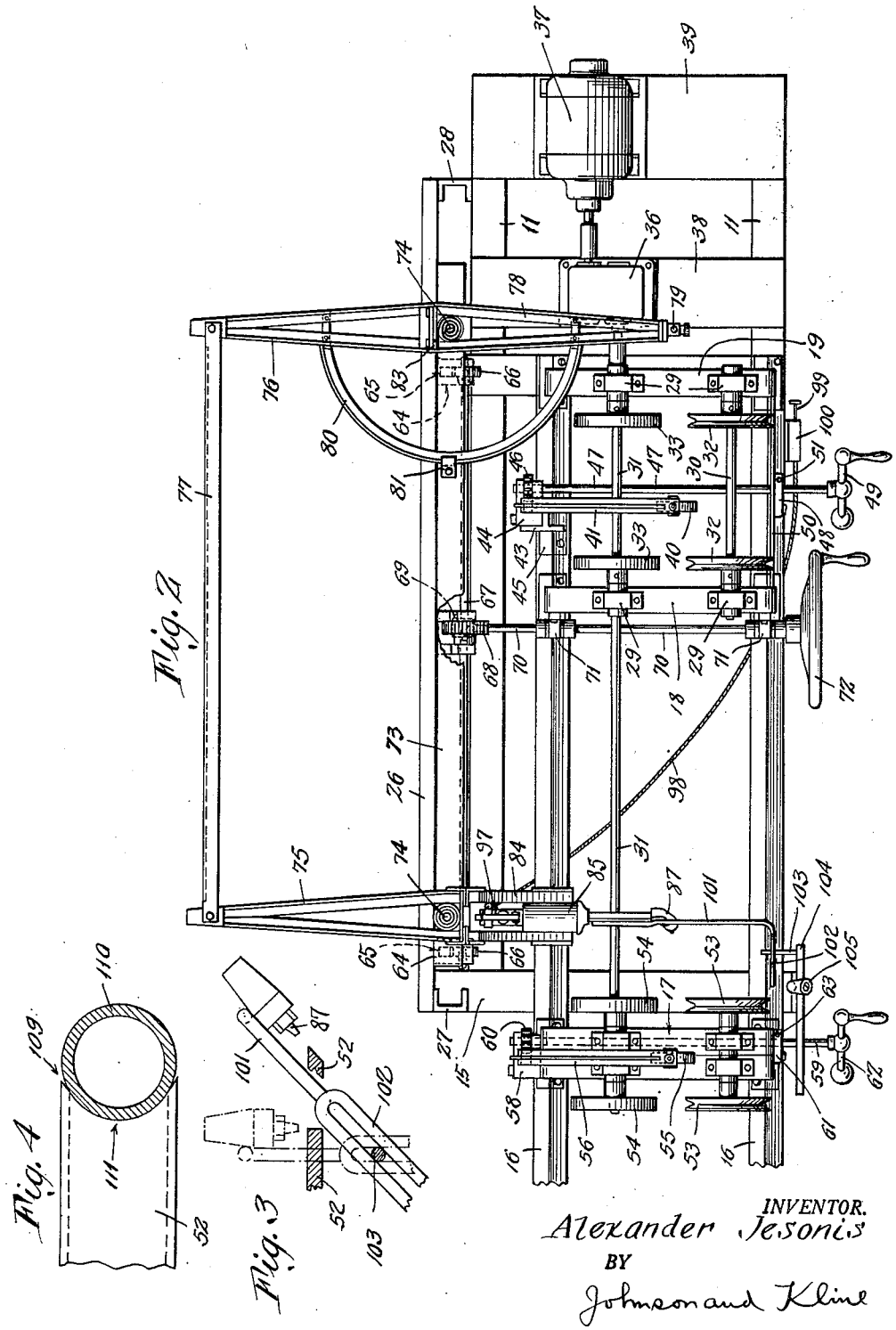
INVENTOR.
Alexander Jesonis
BY
Johnson and Kline
ATTORNEYS Patented Oct. 31, 1950

2,528,147

UNITED STATES PATENT OFFICE 2,528,147

PIPE-CUTTING MACHINE TO PRODUCE
PREDETERMINED CONTOURS OF CUTS

Alexander Jesonis, Stratford, Conn.

Application January 28, 1948, Serial No. 4,838

6 Claims. (Cl. 266—23)

This invention relates to means for cutting pipes to produce different predetermined contours or configurations on the cut end edges.

An object of the invention is to provide an improved machine for automatically cutting and producing or reproducing predetermined contours and angles of cut at the end of a pipe.

Another object of the invention is to provide an improved machine as above, which is extremely simple in construction, and rapid and efficient in operation.

It is often desired to join a large-diameter branch-line pipe to a large-diameter main or supply pipe at some point along the length of the supply pipe without resorting to the use of fittings and the like. An advantageous way of accomplishing this is to provide a side opening in the main pipe, and to butt the branch pipe against the main pipe so as to enclose the opening, and to then weld the joint thus formed. In cutting the end of the branch pipe to have the cut edge closely fit and meet with the walls of the main pipe, the end of the branch pipe is given a scalloped shape or contour, consisting of two curved protruding portions located opposite each other and two curved recessed or receding portions located opposite each other and between the protruding portions. To further effect a close fit, the angle of cut is varied at different points on the contour, the cut being substantially perpendicular to the pipe wall at the recessed portions of the contour, and being inclined to the wall at the protruding portions, thereby causing the cut edge surface of the pipe to closely conform to the cylindrical outer wall surface of the main pipe.

The improved machine of the present invention as provided herein accomplishes such a scalloped cut having different angles of cut quickly and effectively in a single operation, and may reproduce such a scalloped edge accurately as many times as desired.

At times it is found necessary to join a branch pipe to a main pipe in the manner described above even though the branch pipe does not extend at right angles to the main pipe, but instead extends obliquely thereto.

In accordance with this invention an improved machine is provided which is quickly and easily adjustable so as to enable it to cut and produce contours on the end of a pipe which will closely fit the pipe to the wall surface of another pipe regardless of whether the pipes extend at right angles to each other, or obliquely with respect to each other.

A further object of the invention is to provide an improved machine as above, by which a predetermined cut may be produced in a given branch pipe by using as a master or template another pipe which has been previously properly cut and made to fit the main pipe at the point where the joint is to be made.

A feature of the invention resides in the provision of an improved machine according to the above, which may be readily adapted to cut pipes having widely different diameters.

Other features and advantages will hereinafter appear.

In the accompanying drawings:

Fig. 2 is a top or plan view of the machine.

Fig. 3 is a detail in elevation of the cutting means of the machine shown in two different positions, and Fig. 4 is a detail showing a joint made between a main and a branch pipe, using a branch pipe cut by the machine of the invention.

Figure 1:
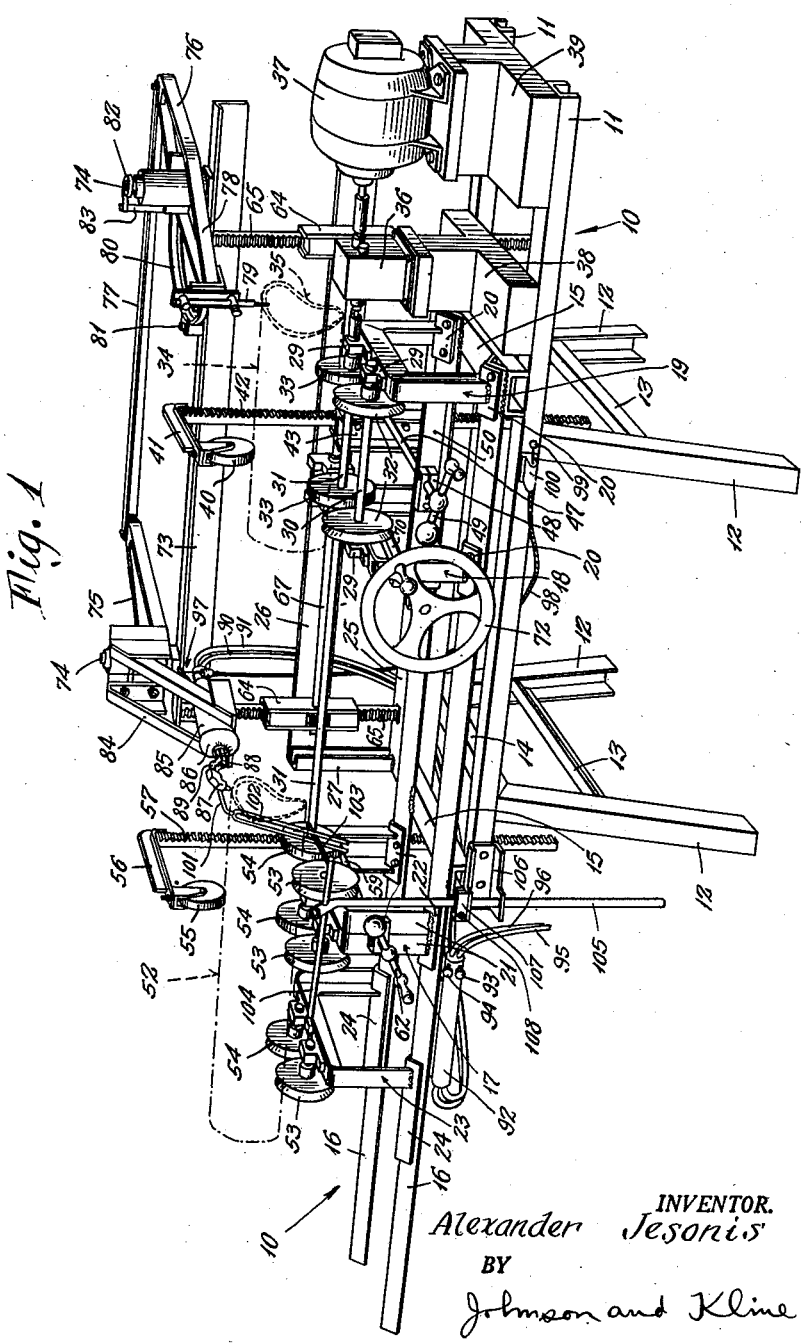
Figure 1 is a perspective front view of the improved machine of the invention.

Referring to Figs. 1 and 2 the present improved machine comprises a horizontal bed 10 formed from a pair of parallel channel-iron strips or members 11 secured to channel-iron legs 12 which latter are connected together in pairs intermediate their ends by angle-iron cross braces or struts 13, and are connected together at their upper extremities by channel-iron members 14. The bed 10 further comprises channel-iron cross bars 15 which are secured to the members 11, and comprises a pair of parallel angle-irons 16 secured to the cross bars 15.

The machine bed 10 carries a plurality of upright inverted U-shaped frames 17, 18 and 19, the frames 18 and 19 being formed of angle iron and being secured to angle iron feet 20 which are bolted to the angle-iron bed members 16. The upright frame 17 is formed from a pair of angle irons 21 bent into U-shapes and at their lower extremities secured to angle iron feet 22 which are also bolted to the angle irons 16 of the bed 10.

A fourth upright frame 23 in the form of an inverted U is provided, formed of a piece of angle iron, the lower ends of the frame being secured to angle iron feet 24 which are carried on the bed members 16 and are slidable longitudinally thereof.

At the rear of the bed 10 another frame is provided, comprising a horizontal angle iron 25 and above the latter a horizontal bar 26. The angle iron 25 is secured to the rear ends of the cross channels 15, and the bar 26 is secured to the upper extremities of a pair of upright channels 27 and 28, the channel 27 being secured to one of the cross channels 15 and the channel 28 being secured to the rear one of the bed channels 11, Fig. 2.

The upright frames 18 and 19 have trunnions 29 providing bearings for a pair of spaced, parallel, horizontal shafts 30 and 31 which shafts have secured to them pairs of wheels 32 and 33 respectively. The wheels of the pairs 32 and 33 are respectively aligned with each other and provide a cradle for a section of pipe 34 having a cut edge 35 of predetermined contour which is to be duplicated in other pipes, the pipe section 34 thereby functioning as a master or template. To provide for automatic rotation of the master pipe section 34, the shaft 31 carrying the wheels 33 is connected with a speed reducer transmission 36 which is driven by an electric motor 37. The transmission 36 is mounted on a block 38 which is secured to the bed channels 11, and the motor 37 is mounted on a block 39 also secured to the bed channels 11. The wheels 33 may be formed of rubber, or may have rubber covered peripheries to provide an effective gripping action with the pipe section 34, thereby to prevent slippage between said section and the wheels.

In order to securely retain the pipe section 34 on the cradle provided by the wheels 32 and 33, a retaining roller 40 is provided for engagement with the top portion of the pipe section, the roller being carried by a horizontal arm 41 secured to an upstanding rack strip 42 which is carried in a slide comprising a channel member 43 and block 44 secured thereto, the channel member being in turn secured to an angle iron foot 45 bolted to the rear angle iron 16 of the bed 10. The rack 42 is engageable with a pinion 46 carried on a shaft 47 which bears in the block 44, the shaft 47 extending forwardly through a second bearing block 48 and carrying at its forward end a hand lever 49. The bearing block 48 is secured to a brace 50 connected to the upright frames 18 and 19, and the said block is split and has a screw 51 by which its friction or pressure on the shaft 47 may be regulated.

Turning of the hand lever 49 will raise or lower the rack 42 and the retaining roller 40 carried on the arm 41, and the friction provided by the bearing block 48 is made sufficient to hold the rack firmly in any adjusted position. Thus the master pipe section 34 may be carried on the wheels 32 and 33 and rotated thereby, while at the same time being securely held in place and prevented from having axial movement.

Referring to Fig. 1, a pipe section 52 which is to have the contour of the edge 35 of the master pipe section 34 duplicated on it, may be carried on the upright frames 17 and 23, by pairs of wheels 53 and 54 rotatably mounted on the said frames. The wheels 54 on the frame 17 are carried on the shaft 31 which carries the wheels 33 and which is extended from the frame 18 to the frame 17 for this purpose. Since this shaft is driven from the speed reducer transmission 36, the wheels 54 will be driven at the same rate and in the same direction as the wheels 33, and the wheels 54 are also preferably made of rubber, or are provided with rubberized or rubber covered peripheries.

To securely hold the pipe section 52 on the wheels 53 and 54 of the frames 17 and 23, a roller 55 is provided for engagement with the top portion of the pipe section, the said roller being carried on a horizontal arm 56 secured to the top extremity of a rack strip 57 which latter is slidably carried in a block 58, Fig. 2, secured to the frame 17. The block 58 provides a bearing for a shaft 59 having a pinion 60 engaging the rack 57, the shaft 59 extending forwardly through a split bearing block 61 and having a hand lever 62 mounted on its foremost end. The bearing block 61 has a screw 63 by means of which the friction between the block and the shaft 59 may be adjusted, and therefore the rack 57 and roller 55 may be made to remain in any adjusted position. It will be noted that the upright frame 23 may be moved along the bed members 16 so as to accommodate different lengths of pipe sections which are to be carried on the frames 23 and 17.

By the above organization the pipe sections 34 and 52 are rotatably carried on the upright frames of the machine by means of the wheels thereof, and are rotated simultaneously automatically by the motor 37, the pipe sections being prevented from having axial movement during such rotation. It will be noted that by operating the hand levers 49 and 62 the pipe sections 34 and 52 may be readily and quickly released for removal or replacement, and this is an extremely advantageous feature which cuts down the setup time of the machine, and provides for a high rate of productivity.

For the purpose of quickly and effectively cutting an edge of predetermined contour and angularity on the pipe section 52 in accordance with the contour of the edge 35 on on the master pipe section 34, a novel automatic guide and cutting mechanism is provided. This mechanism is mounted on the rear upright frame comprising the members 25, 26, 27 and 28 already described, and includes slides 64, Fig. 1, which are secured to the horizontal bar 26 and which slidably carry vertical rack strips 65 engaged by pinions 66 which are carried on a shaft 67 journaled in the slide members 64. The shaft 67 has a worm wheel 68 meshing with a worm 69 carried on a shaft 70 extending forwardly to the front of the machine, the said shaft being journaled in trunnions 71 mounted on the upright frame 18 and having at its forward end a hand wheel 72 by means of which it may be turned. The turning of the hand wheel 72 may therefore raise or lower the rack strips 65. The upper extremities of the rack strips 65 are secured to a horizontal angle iron 73 on which are mounted vertical pivots 74 pivotally carrying horizontal arms 75 and 76 the extremities of which are pivotally connected together by a tie rod 77. The arm 76 has a forward extension 78 on which is mounted a follower 79 for engagement with the scalloped edge 35 of the master pipe section 34. A sector member 80 is secured to the arm 76 and extension 78 thereof, the said member lying in a horizontal plane and extending over the angle member 73, and engaging a clamping lug 81 which is carried on the said angle member. A spiral coil spring 82 is secured at its inner end to the pivot stud 74 and at its outer end to an upright finger 83 which is carried by the arm 76, the said spring tending to rotate the arm 76 in a clockwise direction as viewed from the top of the machine, Fig. 2, and thereby maintaining the follower 79 in engagement with the scalloped edge 35 of the master pipe section 34.

Obviously the arms 75, 76 and tie rod 77 with the associated parts comprise a pantographic frame for supporting and connecting the cam follower 79 and the cutting torch 87.

The arm 75 of the guide mechanism has a forward extension 84 on which is rigidly mounted a bearing member 85 rotatably carrying the shank portion 86 of a cutting torch 87. The torch 87 is fed by pipes 88 and 89 which are connected with flexible hoses 90 and 91, the latter being brought forwardly underneath the bed 10 of the machine to a fitting 92 having valves 93 and 94. The fitting 92 has hoses 95 and 96 which may be connected to a suitable source of supply for an oxyacetylene torch, for example. A valve 97 is provided in the shank portion 86 of the torch 87 and is connected to a Bowden wire 98 which is brought forwardly under the bed 10 of the machine to a manually operable knob 99 carried by a bracket 100 secured to the front channel member 11 of the machine bed. Manipulation of the knob 99 may thus regulate the flow of fluids to the torch 87; also, the valves 93 and 94 of the fitting 92 may be adjusted to regulate the rate of flow to the fluids.

In accordance with the present invention, the torch 87 is provided with a forwardly extending arm 101 which at its forward extremity has a depending fork 102 extending on opposite sides of an actuating finger 103 mounted on a bar 104 which is rigidly carried at the upper extremity of a vertical bar or standard 105, the latter being vertically adjustable in a fitting 106 secured to the front channel member 11 of the machine bed. The fitting 106 includes a split block 107 having a screw 108 by means of which the standard 105 may be held in different adjusted vertical positions and also prevented from turning.

The operation of the improved machine of this invention is as follows: The clamping lug 81 which engages the sector member 80 is loosened so that the sector member is free to swing in either direction, together with the arm 76 and arm extension 78. The master pipe section 34 is placed on the cradle wheels 32 and 33, with the receding or recessed portion of the pipe section in engagement with the follower 79. If necessary, the hand wheel 72 is turned one way or the other in order to lower or raise the assembly including the angle member 73 and the pivotally connected arms 75 and 76, together with the arm 78 and follower 79, thereby to properly locate the follower vertically for engagement with the uppermost portion of the pipe edge 35. The pipe section 34 is then shifted axially one way or the other to bring the cutting torch 87 into a vertical position wherein the flame from the torch will be directed vertically downward, and for this position the fork 102 will be vertical. When this has been accomplished the hand lever 49 is turned to bring the retaining roller 40 down into engagement with the top surface of the master pipe section 34. This pipe section will then have been properly positioned in the machine. The pipe section 52 to be cut is next placed on the wheels 53 and 54, and the upright frame 23 shifted along the bed members 16 as required to properly adequately support the pipe section. The pipe section 52 is now shifted axially until the end portion thereof, which is to be cut to the desired configuration, is directly below the cutting torch 87, and preferably the edge of this pipe section is located a half inch or so to the right of the torch, as viewed in Fig. 1. The hand lever 62 is now turned to bring the retaining roller 55 down into engagement with the upper surface of the pipe section 52, whereupon the said section will be securely held on the cradle wheels 53 and 54 against axial shifting. Next the motor 37 is started and operated to centralize one of the protruding portions of the pipe edge 35 on the follower 79. The motor 37 is then halted to maintain this position, and the angle of the torch 87 observed. It will be noted that, due to the arms 75 and 76 swinging counterclockwise, as viewed in Fig. 2, by virtue of the follower 79 riding up on the protruding portion of the pipe edge 35, the bearing member 85 for the torch shank 86 will also have been carried counterclockwise about the pivot 74 and will have caused the torch to swing (turning in the bearing 85), to a position such as the full-line position shown in Fig. 3, this being the result of engagement of the fork 102 carried by the torch with the actuating finger 103 carried on the bar 104 and standard 105.

Referring to Figs. 3 and 4, the angularity of the torch when in this position should conform to the angularity of the edge of the pipe branch, in the joint which is to be made and which is shown in Fig. 4, at the point 109. If this angularity is not obtained, adjustment may be made by raising or lowering the standard 105 until the desired angle is had. This adjustment of the standard 105 will not alter the vertical starting position of the nozzle 87 mentioned above, which is obtained when the follower 79 is at the center of the recessed or receding portion of the pipe edge 35, since for such vertical positioning of the nozzle 87 the depending fork 102 will lie in the vertical, and any raising or lowering of the standard 105 will not change such vertical position nor swing the nozzle 87 out of its vertical. The said vertical position of the torch 87 and fork 102 is shown in broken lines in Fig. 3, as well as the right angle cut which is effected by the torch in the wall of the pipe section 52. The angular cut effected by the torch 87 when the latter is angularly inclined is also shown in Fig. 3, in full lines.

After this adjustment for angularity has been effected, the valves for the torch may be opened and the torch lighted, whereupon the motor 37 is started and the pipe sections 34 and 52 caused to turn through at least one complete revolution. In so doing the torch 87 will automatically cut the edge of the pipe section 52 along a scalloped contour as shown, and will also automatically change the angle of cutting while following the said contour, so that when the cut end of the pipe section 52 is made to abut the side of another pipe section 110, Fig. 4, the cut edge will closely conform to the outer cylindrical side surface of the pipe section 110.

It will be seen that at the point 109 in the cut edge, the angle of the cutting will be oblique to the wall, and at the point 111 in the cut edge (at the center of the recessed portion of the edge) the angle of cutting will be 90° with respect to the wall of the pipe section 52.

While I have shown herein one embodiment of my invention whereby a preformed pipe section is used as a master or pattern and wherein another pipe section is cut to provide a scalloped edge having different angularity at different locations on the edge, it should be understood that other shapes of master patterns may be use, inasmuch as the pipe section 34 in conjunction with the supporting and rotating means therefore comprises essentially a cam, of which device many different forms are well known. It will be noted that the follower 79 is not required to conform to the angularity of the pipe edge 35 as measured with respect to the wall of the pipe section 34, it being merely necessary for the follower to follow the contour of the edge 35. Therefore, other types of cams or guides may be employed in conjunction with the follower 79, it being merely necessary to cause the follower to follow a predetermined contour whereby the arm 76 and arm extension 78 is caused to swing or oscillate about the vertical pivot 74. This movement not only causes the cutting torch 87 to follow the desired contour, but through the action of the fork 102 and guide finger 103 together with the rotary mounting of the torch in the bearing member 85, an angularity is automatically established as the cutting progresses, the said angularity changing automatically to provide an abutting edge on the pipe section 52 which causes the said edge to closely conform to the cylindrical outside of the pipe section 110.

If the pipe section 52 is to be brought into the pipe section 110 at an oblique angle rather than a right angle, the edge of the pipe section 52 may be properly cut in the present improved machine by merely properly adjusting the standard 105 and by inserting the proper master pipe section or cam having the desired edge contour, on the carriage wheels 32 and 33.

If it is desired to cut off the end of the pipe section 52 squarely, that is, where the angle of the cut at all points thereon is 90° to the wall of the pipe, this may be accomplished by disengaging the fork 102 from the guide finger 103 and by locking the torch 87 in the bearing 85 in its vertical position. Also, if the clamping lug 81 is tightened on the sector member 80, the master pipe section 34 may be dispensed with, and a completely circular cut may be performed on the pipe section 52. The angle of such a completely circular cut with respect to the wall of the pipe section 52 may have different values, and may be adjusted by adjustment of the bar 104 in the vertical standard 105 when the fork 102 is being guided by the finger 103. It is thus seen that a large variety of different cuts having different contours and different degrees of angularity may be performed on the pipe section 52, and the angularity may be maintained uniform or may be made to vary automatically as the cut is progressing, as desired.

Other variations and modifications may be made within the scope of this invention and portions of the improvements may be used without others.

I claim:

1. A pipe-cutting machine comprising means for rotatably supporting a pipe to be cut, means for rotatably supporting in axial alignment with the pipe to be cut a pipe-shaped template having an end contour forming a pipe-cutting pattern, a horizontally movable pantograph frame having a torch-supporting arm in operative relation to a pipe on said pipe-supporting means, and a second arm to support a follower in engagement with the end of a pipe-shaped template on said template-supporting means, a template follower secured to said second arm in position to engage the end of said pipe-shaped template, means yieldingly holding said frame with said follower engaging said template, means for pivotally supporting a cutting torch on said torch-supporting arm, means for simultaneously rotating said pipe and template at the same rotary speed whereby said template follower is caused to operate said pantograph frame to move said torch axially of said rotating pipe to cut the end thereof on a determinate pattern, and mechanism responsive to the axial movement of the torch to oscillate said torch and vary the angle of cut made by said torch in accordance with the movement of said frame.

2. A pipe-cutting machine comprising means for rotatably supporting a pipe to be cut, means for rotatably supporting in axial alignment with the pipe to be cut a pipe-shaped template having an end contour forming a pipe-cutting pattern, a horizontally movable pantograph frame having a substantially horizontal torch-supporting arm in operative relation to a pipe on said pipe-supporting means, a cutting torch pivotally supported on said arm in position to cut a pipe on said support, a second substantially horizontal arm parallel to said first arm in operative relation to the end of a pipe-shaped template on said template-supporting means, a template follower secured to said second arm in position to engage the end of said pipe-shaped template, means yieldingly holding said frame with said follower engaging said template, means for simultaneously rotating said pipe and template whereby said template follower is caused to operate said pantograph frame to move said torch axially of said rotating pipe to cut the end thereof on a determinate pattern, and mechanism responsive to the axial movement of the torch to oscillate said torch and vary the angle of cut made by said torch in accordance with the movement of said frame including a vertically extending member connected to said torch and movable therewith to control the angular position thereof, and a relatively stationary member adapted to engage and oscillate said vertical member on horizontal movement of said torch.

3. A pipe-cutting machine comprising means for rotatably supporting a pipe to be cut, means for rotatably supporting in axial alignment with the pipe to be cut a pipe-shaped template having an end contour forming a pipe-cutting pattern, a horizontally movable pantograph frame having a substantially horizontal torch-supporting arm in operative relation to a pipe on said pipe-supporting means, a cutting torch pivotally supported on said arm in position to cut a pipe on said support, a second substantially horizontal arm parallel to said first arm in operative relation to the end of a pipe-shaped template on said template supporting means, a template follower secured to said second arm in position to engage the end of said pipe-shaped template, means yieldingly holding said frame with said follower engaging said template, means for simultaneously rotating said pipe and template whereby said template follower is caused to operate said pantograph frame to move said torch axially of said rotating pipe to cut the end thereof on a determinate pattern, and mechanism responsive to the axial movement of the torch to oscillate said torch and vary the angle of cut made by said torch in accordance with the movement of said frame including a vertically extending member connected to said torch and movable therewith to control the angular position thereof, a relatively stationary member adapted to engage and oscillate said vertical member on horizontal movement of said torch, and means for adjusting the vertical position of said relatively stationary member to vary the degree of angular change of said torch on a given horizontal movement thereof.

4. A pipe-cutting machine comprising means for rotatably supporting a pipe to be cut, means for rotatably supporting in axial alignment with the pipe to be cut a pipe-shaped template having an end contour forming a pipe-cutting pattern, a horizontally movable pantograph frame having a substantially horizontal torch-supporting arm in operative relation to a pipe on said pipe-supporting means, a cutting torch pivotally supported on said arm in position to cut a pipe on said support, a second substantially horizontol arm parallel to said first arm in operative relation to the end of a pipe-shaped template on said template-supporting means, a template follower secured to said second arm in position to engage the end of said pipe-shaped template, means yieldingly holding said frame with said follower engaging said template, means for simultaneously rotating said pipe and template whereby said template follower is caused to operate said pantograph frame to move said torch axially of said rotating pipe to cut the end thereof on a determinate pattern, and mechanism responsive to the axial movement of the torch to oscillate said torch and vary the angle of cut made by said torch in accordance with the movement of said frame including a vertically extending member connected to said torch and movable therewith to control the angular position thereof, and a relatively stationary member adapted to engage and oscillate said vertical member on horizontal movement of said torch, said members being disengageable to permit cutting a pipe at a fixed angle.

5. A pipe-cutting machine comprising means for rotatably supporting a pipe to be cut, means for rotatably supporting in axial alignment with the pipe to be cut a pipe-shaped template having an end contour forming a pipe-cutting pattern, a horizontally movable pantograph frame having a substantially horizontal torch-supporting arm in operative relation to a pipe on said pipe-supporting means, a cutting torch pivotally supported on said arm in position to cut a pipe on said support, a second substantially horizontal arm parallel to said first arm in operative relation to the end of a pipe-shaped template on said template-supporting means, a template follower secured to said second arm in position to engage the end of said pipe-shaped template, means yieldingly holding said frame with said follower engaging said template, means for simultaneously rotating said pipe and template whereby said template follower is caused to operate said pantograph frame to move said torch axially of said rotating pipe to cut the end thereof on a determinate pattern, and mechanism responsive to the axial movement of the torch to oscillate said torch and vary the angle of cut made by said torch in accordance with the movement of said frame including a vertically extending fork connected to said torch and movable therewith to control the angular position thereof, a vertically adjustable, relatively stationary member adapted to engage and oscillate said vertical fork on horizontal movement of said torch, and means for adjusting the vertical position of said relatively stationary member to vary the degree of angular change of said torch on a given horizontal movement thereof.

6. A pipe-cutting machine comprising means for rotatably supporting a pipe to be cut, means for rotatably supporting in axial alignment with the pipe to be cut a pipe-shaped template having an end contour forming a pipe-cutting pattern, a horizontally movable pantograph frame having a substantially horizontal torch-supporting arm in operative relation to a pipe on said pipe-supporting means, a second substantially horizontal arm parallel to said first arm in operative relation to the end of a pipe-shaped template on said template-supporting means, a template follower secured to said second arm in position to engage the end of said pipe-shaped template, means for pivotally supporting a cutting torch on said torch-supporting arm, means for simultaneously rotating said pipe and template whereby said template follower is caused to operate said pantograph frame to move said torch axially of said rotating pipe to cut the end thereof on a determinate pattern, mechanism responsive to the axial movement of the torch to vary the angle of cut made by said torch in accordance with the movement of said frame, and means to lock said frame against movement whereby to cut a pipe in a substantially radial plane.

ALEXANDER JESONIS.

REFERENCES CITED

The following references are of record in the file of this patent:

UNITED STATES PATENTS

| Number | Name | Date |
|---|---|---|
| 1,396,993 | Carter | Nov. 15, 1921 |
| 1,826,164 | Carrier, Jr., et al. | Oct. 6, 1931 |
| 1,954,549 | Twigg et al. | Apr. 10, 1934 |
| 2,035,765 | Schmidt | Mar. 31, 1936 |
| 2,102,259 | Edwards et al. | Dec. 14, 1937 |
| 2,295,229 | McGuire | Sept. 8, 1942 |
| 2,379,630 | Fall | July 3, 1945 |
| 2,384,128 | Nation | Sept. 4, 1945 |

FOREIGN PATENTS

| Number | Country | Date |
|---|---|---|
| 626,443 | France | Sept. 6, 1927 |
| 482,437 | Great Britain | Mar. 25, 1938 |